United States Patent [19]

Nagata et al.

[11] Patent Number: 4,583,791
[45] Date of Patent: Apr. 22, 1986

[54] CRAWLER VEHICLE UNDERCARRIAGE

[75] Inventors: Yoshihiro Nagata, Jyoyo; Kazuyuki Onohara, Hirakata; Koji Ukibe, Hirakata; Toshio Kitani, Hirakata, all of Japan

[73] Assignee: Kabushiki Kaisha Komatsu Seisakusho, Tokyo, Japan

[21] Appl. No.: 588,841

[22] Filed: Mar. 12, 1984

[51] Int. Cl.[4] .................. B65D 65/10; B62D 55/16
[52] U.S. Cl. ........................... 305/27; 305/28; 305/31
[58] Field of Search ............... 305/21, 22, 24, 25, 305/27, 28, 31; 180/9.5, 9.62

[56] References Cited

U.S. PATENT DOCUMENTS

| | | | |
|---|---|---|---|
| 3,323,841 | 6/1967 | Mason | 305/22 |
| 3,484,139 | 12/1969 | Danner | 305/27 |
| 3,826,325 | 7/1974 | Purcell et al. | 305/22 X |
| 4,097,093 | 6/1978 | Shelby et al. | 305/22 |
| 4,230,378 | 10/1980 | Purcell et al. | 305/27 X |
| 4,351,572 | 9/1982 | Fujiwara et al. | 305/27 |
| 4,406,501 | 9/1983 | Christensen | 305/28 X |

Primary Examiner—David A. Scherbel
Attorney, Agent, or Firm—Armstrong, Nikaido, Marmelstein & Kubovcik

[57] ABSTRACT

A crawler vehicle undercarriage which comprises a first cylindrical track frame pivotally mounted to a vehicle frame and a second cylindrical track frame telescopically received within the first track frame. An idler is pivotally and rotatably mounted through a cushion pad to a forward end of the second track frame while a drive sprocket is mounted to a drive shaft. A track chain encompasses the idler and the drive sprocket and is in driven engagement with the drive sprocket. A recoil spring is interposed between the first and second track frames for urging the idler away from the sprocket to maintain track tension. First and second crank members are pivotally mounted to the first track frame with a common pivot axis. A bogie is pivotally mounted to the respective crank members and a pair of track rollers are pivotally mounted to each bogie, the track rollers engaging the track chain.

1 Claim, 5 Drawing Figures

CRAWLER VEHICLE UNDERCARRIAGE

BACKGROUND OF THE INVENTION

The present invention relates to a soft undercarriage for a crawler vehicle.

As an undercarriage for a crawler vehicle there is known, for example, an undercarriage in which a sprocket, an idler and upper and lower track rollers are rotatably mounted to a track frame attached to a vehicle body, with an endless track being entrained about the sprocket, idler and upper and lower track rollers. In such known structure, however, an excessive impact force acts on the idler portion when the vehicle gets over an obstacle, and it is transmitted to the vehicle body, thus causing trouble or breakage of not only the idler but also the vehicle body and devices attached to the vehicle body. As a result, it becomes necessary for those components to be rigid and durable enough to withstand such impact force, and this leads to an increase in the weight and cost of the vehicle. Moreover, the vehicle becomes less comfortable for the operator to ride in because an excessive impact force is exerted on the vehicle body. Further, since the lower track rollers are directly attached to the track frame, a part of the endless track may not contact a road surface when the road surface presents complicated changes. As a result, the effective grounding area of the endless track becomes smaller and so the tractive force is reduced, thus allowing shoe slip (skidding of the endless track against the road surface) to occur easily and making an effective utilization of the engine output impossible.

Additionally, since there may be some lower track rollers not in contact with the road surface, the burden of the grounded lower track rollers becomes so much heavier and their wear is accelerated. If the size of the shafts and rollers of the lower track rollers is increased in an effort to solve this problem, an increase in the weight and cost of the vehicle results.

Moreover, since the lower track rollers are directly attached to the track frame, even a slight change of a road surface causes pitching and rolling of the entire vehicle body, thus leading to an increased fatigue of the operator. Besides, in the case of leveling of land by the use of a blade, a rough road causes an increased pitching of the vehicle body to the extent that the land leveling work is very difficult to perform.

Further, since the support shaft portion of the idler is slidably in planar contact with the wear plate portion of the track frame, the sliding portion permits an easy entry of earth and sand, so wears in an early stage and thus is poor in durability. Besides, as previously noted, the sliding portion of the idler is complicated in structure and requires a large number of parts, thus resulting in that the assembling performance is deteriorated and the number of assembling steps increases.

Moreover, the track frame is box-shaped in section and its torsional rigidity is poor in view of its structure, so if it is increased in size so as to have a rigidity sufficient to withstand torsional loads while retaining its structure, the cost of the vehicle is increased due to its increased weight, etc.

There also is known an undercarriage, as disclosed in U.S. Pat. Nos. 3,774,708 and 3,826,325 in which a first track frame and a second track frame are pivotally connected; a pair of front and rear idlers are attached to the first and second track frames; a sprocket is mounted to an upper part of the vehicle body; an endless track is entrained about the paired idlers and the sprocket; and lower track rollers are supported vertically pivotably by the first and second track frames. In this structure, however, since the sprocket is mounted in a high position, a power transmission mechanism, including final reduction gears, is disposed in a relatively high position of the vehicle body and the position of the center of gravity of the vehicle inevitably becomes higher, thus resulting in that the distribution of the pressure of ground contact on a slope becomes less uniform and the working efficiency is deteriorated.

Moreover, since a crank is connected to the first track frame pivotably through a pin and the rear idler and lower track rollers are pivotally connected to the crank, not only an increase in pitching and in the operator's fatigue results but also it becomes difficult to perform the land leveling work using a blade.

Further, when a ripper is forced into the ground, the vehicle body is lifted with the pivot center of a lower track roller positioned near the front idler as a fulcrum, so that the distance between the ripper and the fulcrum becomes shorter by the distance between the idler center and the pivot center in comparison with the undercarriage of the type first referred to, and the insertion force of the ripper is reduced. Besides, since the center of gravity is positioned high, both static and dynamic stabilities of the vehicle are deteriorated. Moreover, not only a longer endless track than conventional ones is required but also the vehicle becomes heavier because of the provision of an additional idler, which leads to an increased cost of the vehicle.

SUMMARY OF THE INVENTION

It is therefore an object of the present invention to provide a crawler vehicle undercarriage which overcomes the above noted problems of the prior art.

Another object of the present invention is to provide a soft-type crawler vehicle undercarriage wherein when the vehicle runs on a complexly changing road surface, the lower track rollers move up and down according to the changes of the road surface which enables a large tractive force to be obtained and the engine output to be utilized effectively.

In accordance with an aspect of the present invention, there is provided an undercarriage for a crawler vehicle having a vehicle frame and a drive shaft, comprising: a first cylindrical track frame pivotally mounted to said vehicle frame; a second cylindrical track frame telescopically received within said first track frame; an idler pivotally and rotatably mounted to one end of said second cylindrical track frame; a sprocket mounted to said drive shaft; a track chain encompassing said idler and said sprocket and in driven engagement with said sprocket; recoil means interposed between said first and second track frames for urging said idler away from said sprocket to maintain track tension; a first crank member having a first and second end with the first end being pivotally mounted to said first track frame; a second crank member having a first and second end with the first end being pivotally mounted to said first track frame, said second crank member sharing a common pivot axis with said first crank member; roller means mounted to the second ends of said first and second crank members and in engagement with said track chain, each of said roller means comprising a bogie pivotally mounted to the second end of any one of said first and second crank members, and track rollers rotatably mounted to said bogie and engaging said track chain; and cushion pads interposed between said first track frame and said first and second crank members, respectively.

The above and other objects, features and advantages of the present invention will be readily apparent from the following description taken in conjunction with the accompanying drawings.

DESCRIPTION OF THE PREFERRED EMBODIMENT

An embodiment of the present invention will be described hereinunder with reference to the accompanying drawings.

Figure 1:
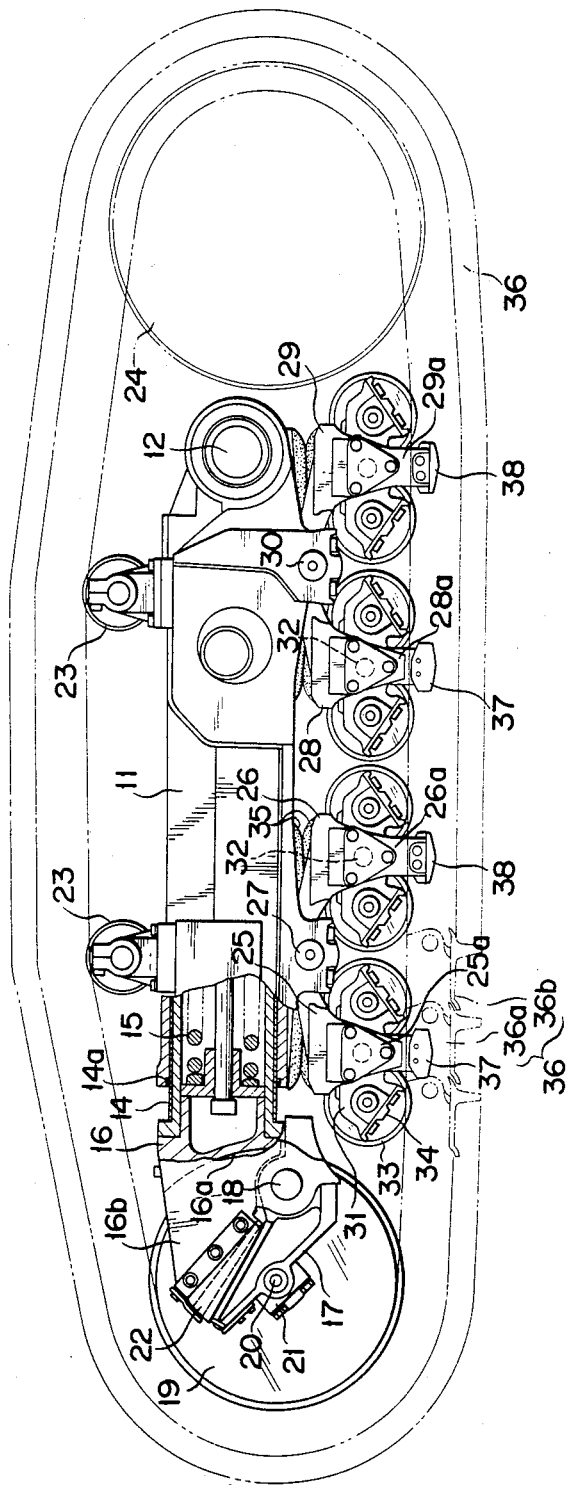
FIG. 1 is a front elevational view of an undercarriage according to the present invention wherein a sprocket and a track chain are shown in phantom lines.
Figure 2:
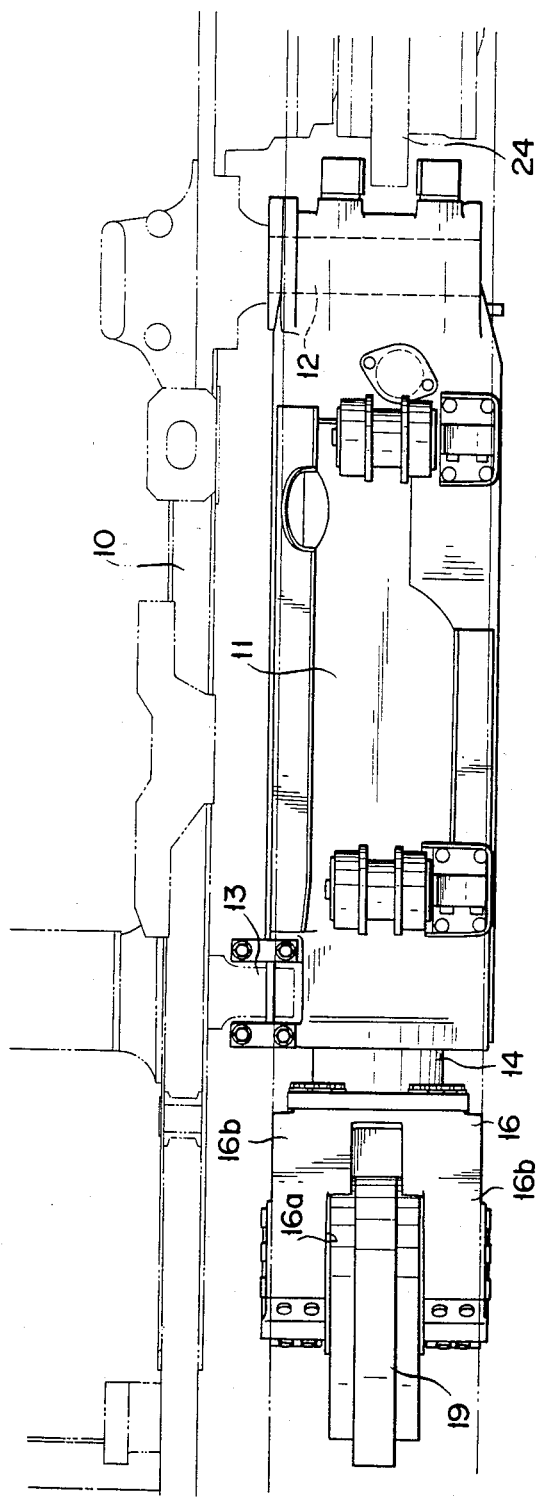
FIG. 2 is a top plan view of the undercarriage wherein the track chain is omitted.
Figure 3:
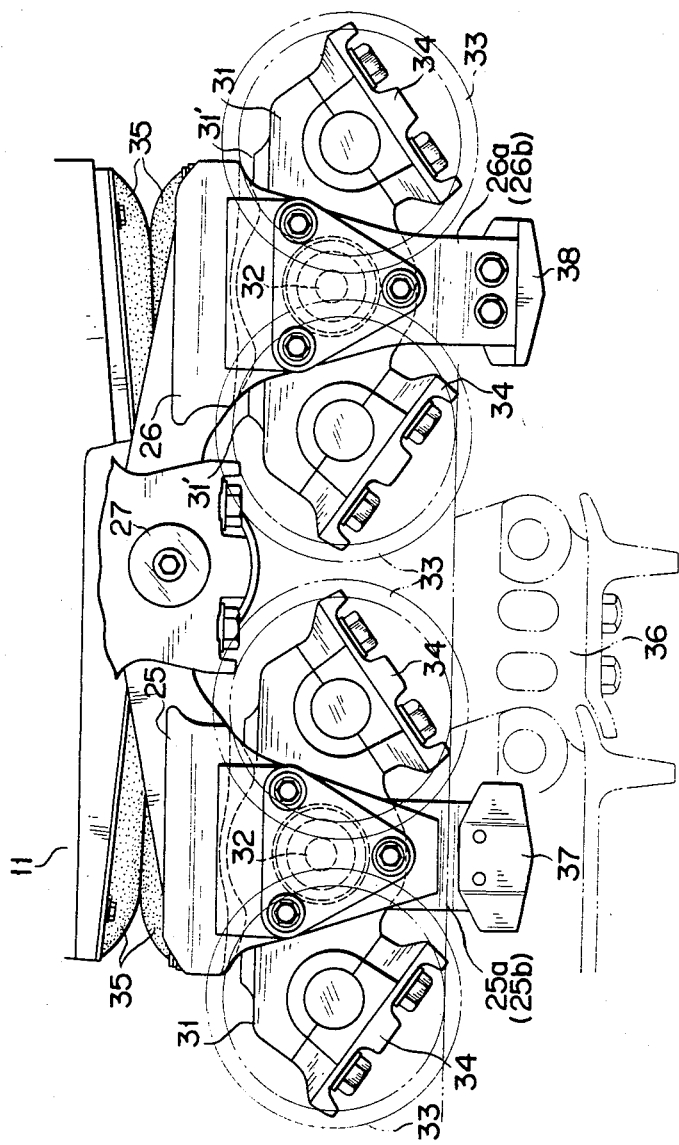
FIG. 3 is an enlarged front elevational view showing mounting details of lower track rollers.
Figure 4:
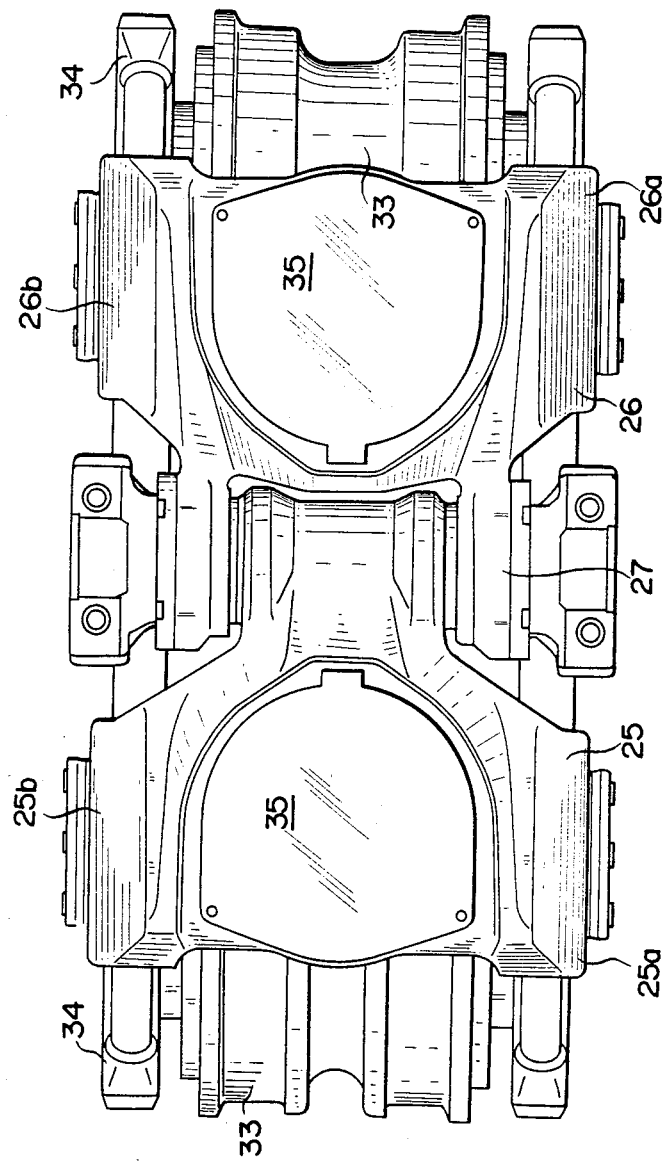
FIG. 4 is a top plan view thereof.
Figure 5:
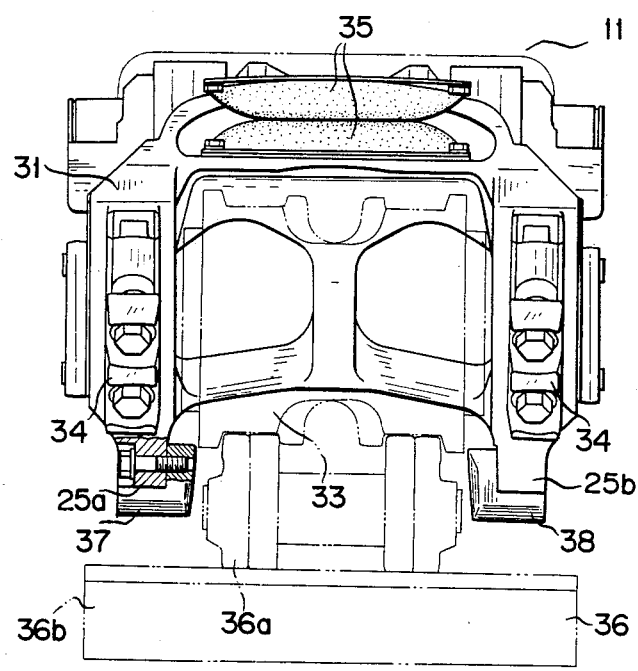
FIG. 5 is a side elevational view thereof.

FIG. 1 is a front view and FIG. 2 is a plan view in which an endless track has been removed. On both sides of a vehicle frame 10 and at rear ends sides a pair of first track frames 11 are supported each vertically pivotably through a support shaft 12, and an equalizer bar 13 is mounted extending over the paired first track frames 11 and the vehicle frame 10.

The first track frame 11 is cylindrical, in the front portion of which is fitted a cylindrical second track frame 14 slidably through an annular wear plate 14a. In the interior of the second track frame 14 is provided an idler tension spring 15, and an idler yoke 16 is attached to the second track frame 14. A pair of idler cranks 17 are supported by the idler yoke 16 vertically pivotably through a pin 18, and between the paired idler cranks 17 are mounted both end portions of a support shaft 20 of an idler 19 rotatably through a cap 21. Further, an idler cushion rubber 22 is interposed between the paired idler cranks 17 and both end walls of the idler yoke 16. More specifically, the idler yoke 16 is formed with a notched portion 16a to form two end walls 16b, and the idler cushion rubber 22 is interposed between both end walls 16b and the paired idler cranks 17.

Upper track rollers 23 are mounted on top of the first track frame 11, and a sprocket 24 is mounted at the rear portion of the vehicle frame 10. On the front side of the lower portion of the first track frame 11 are mounted first and second cranks 25 and 26 longitudinally symmetrically and vertically pivotably through a front pin 27, while on the rear side there are mounted first and second cranks 28 and 29 also longitudinally symmetrically and vertically pivotably through a rear pin 30. A bogie 31 is mounted to each of the cranks 25, 26, 28 and 29 vertically pivotably through a pin 32, and to both end portions of the bogie 31 are attached lower track rollers 33 with caps 34. Between each of the cranks 25, 26, 28 and 29 and the first track frame 11 are disposed cushion rubbers 35 in an opposed manner.

Further, an endless track 36 is entrained about the idler 19, upper track rollers 23, sprocket 24 and lower track rollers 33. The endless track 36 comprises track shoes 36b having links 36a which are pivotally connected in an endless fashion through pins.

The cranks 25, 26, 28 and 29 are provided on both sides thereof with vertical walls 25a and 25b, 26a and 26b, 28a and 28b, and 29a and 29b, respectively, and between these vertical side walls of each cranks is supported the bogie 31 pivotably through the pin 32. Further, a one-side stop piece 37 is attached to one side vertical wall of each of the first cranks 25 and 28, while to the opposite side vertical wall of each of the second cranks 26 and 29 is attached an opposite-side stop piece 38, thereby preventing the endless track 36 from coming off the lower track rollers 33.

The weight of the vehicle frame and undercarriage during running or stop in FIG. 1 is borne by the idler 19, sprocket 24 and lower track rollers 33.

The reaction force of ground contact applied to a pair of lower track rollers 33 is transmitted to the pin 32, and the crank 29 which is pivotable through the pin 30 rotates upon receipt of the reaction force from the pin 32, thereby causing the cushion rubbers 35 disposed on the crank 29 and below the support shaft 12 to be distorted by the magnitude corresponding to the reaction force to keep the balance. In the event the lower track roller 33 on one side undergoes a push-up force induced by a specially large projection, the bogie 31 pivots about the pin 32 until a stopper 31' formed on the upper surface of the bogie abuts the crank, and thus serves as a stopper. Also in this case, the crank 29 pivots about the pin 30 and the push-up force induced by the projection is transmitted to the cushion rubbers 35 and thereby cushioned.

It is apparent from the drawings that the other lower track rollers also operate in the same manner.

In case a projection impinges against the endless track 36 during vehicular running, the idler 19 pivots about the pin 18 while receiving a reaction component in the rotational direction, and cushioned by the idler cushion rubber 22.

The above embodiment has the following advantages. The impact force acting on the idler 19 when the vehicle gets over an obstacle can be cushioned by the action of both the idler crank 17 and the idler cushioned rubber 22. Consequently, the impact force not only against the idler 19 but also against the vehicle frame 10 and devices attached to the vehicle frame is reduced, and the rigidity and durability of the idler 19 and the devices can be improved without the need for increase in size, whereby not only the vehicle weight can be reduced and its cost largely lowered, but also the impact force can be absorbed by the idler cushion rubber 22 without direct transmission to the vehicle frame 10, which leads to an improvement of the operator's comfortableness.

Further, when the vehicle runs on a complexly changing road surface, the lower track rollers move up and down according to the changes of the road surface through the action of the bogies 31, cranks 25, 26, 28, 29 and cushion rubbers 35, and thus contact the road surface at all times. Therefore, the ground contact area of the endless track increases and a large tractive force is obtained, so the engine output can be utilized effectively and the lower track rollers are equally loaded. Consequently, it is not necessary to enlarge the shafts and rollers of the lower track rollers, etc. more than necessary, thus permitting reduction in weight and in cost. Moreover, the wear of the lower track rollers 33 is reduced and the life thereof can be so much improved. Besides, pitching and rolling motions of the vehicle against changes of a road surface lessen, so the operator's fatigue is diminished, and the land leveling work using a blade becomes easier.

Further, since the first and second track frames 11 and 14 are cylindrical and fit together slidably through the annular wear plate 14a, there is no fear of entry of earth and sand between the first and second track frames 11 and 14. Consequently, the durability of the sliding portion of the idler 19 is improved, the structure becomes more simplified, the number of parts required decreases, the assembling performance is improved, and the number of assembling steps can be decreased. Besides, the torsional rigidity of the first and second track frames 11 and 14 is enhanced, thus permitting reduction in weight and hence in cost.

Moreover, since the sprocket 24 is mounted in a low position of the vehicle frame 10, the position of the center of gravity of the vehicle becomes lower, so that the distribution of the pressure of ground contact on a slope becomes more uniform and an improvement can be attained in both working efficiency and static and dynamic stabilities.

Further, since the first track frame 11 is pivotally supported by the support shaft 12, pitching is diminished, whereby not only the operator's fatigue can be reduced but also it becomes easier to perform the land leveling work.

Moreover, since the center of the idler 19 serves as a fulcrum when the ripper is forced into the ground, a large ripper inserting force is obtained, whereby the working efficiency is remarkably improved.

Additionally, since the sprocket 24 is disposed in a low position and the provision of only one idler 19 suffices, it is possible to shorten the overall length of the endless track 36, that is, the vehicle weight and hence its cost can be reduced.

While the invention has been described and shown with particular reference to the preferred embodiment, it will be apparent that variations might be possible that would fall within the scope the present invention which is not intended to be limited except as defined in the following claims.

What is claimed is:

1. An undercarriage for a crawler vehicle having a vehicle frame and a drive shaft, comprising:

a first cylindrical track frame pivotally mounted to said vehicle frame;

a second cylindrical track frame telescopically received within said first track frame;

an idler pivotally and rotatably mounted to one end of said second cylindrical track frame;

an idler cushion pad disposed between said second track frame and said idler;

a sprocket mounted to said drive shaft;

a track chain encompassing said idler and said sprocket and in driven engagement with said sprocket;

recoil means interposed between said first and second track frames for urging said idler away from said sprocket to maintain track tension;

a first crank member having a first and second end with the first end being pivotally mounted to said first track frame;

a second crank member having a first and second end with the first end being pivotally mounted to said first track frame, said second crank member sharing a common pivot axis with said first crank member;

roller means mounted to the second end of said first and second crank members and in engagement with said track chain, each of said roller means comprising a bogie pivotally mounted to the second end of any one of said first and second crank members, and track rollers rotatably mounted to said bogie and engaging said track chain;

cushion pads interposed between said first track frame and said first and second crank members, respectively; and said second end of each of said first and said second crank members each being bifurcated transversely with respect to said vehicle frame and having a first and second side wall;

said undercarriage further comprises a first stop attached to each of said first side walls and extending downwardly therefrom and a second stop attached to each of said second side walls and extending downwardly therefrom, said first and second stops being disposed opposite said track chain for preventing said track chain from coming off said track rollers.

* * * * *